US010277908B2

(12) United States Patent
Xu et al.

(10) Patent No.: US 10,277,908 B2
(45) Date of Patent: Apr. 30, 2019

(54) INTER-LAYER SAMPLE ADAPTIVE FILTER PARAMETERS RE-USE FOR SCALABLE VIDEO CODING

(71) Applicants: Lidong Xu, Beijing (CN); Yi-Jen Chiu, San Jose, CA (US); Zhipin Deng, Beijing (CN); Wenhao Zhang, Beijing (CN); Yu Han, Beijing (CN); Xiaoxia Cai, Beijing (CN); Hong Jiang, El Dorado Hills, CA (US); INTEL CORPORATION, Santa Clara, CA (US)

(72) Inventors: Lidong Xu, Beijing (CN); Yi-Jen Chiu, San Jose, CA (US); Zhipin Deng, Beijing (CN); Wenhao Zhang, Beijing (CN); Yu Han, Beijing (CN); Xiaoxia Cai, Beijing (CN); Hong Jiang, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/976,541

(22) PCT Filed: Sep. 25, 2012

(86) PCT No.: PCT/CN2012/081908
§ 371 (c)(1),
(2) Date: Jun. 27, 2013

(87) PCT Pub. No.: WO2014/047776
PCT Pub. Date: Apr. 3, 2014

(65) Prior Publication Data
US 2015/0131747 A1    May 14, 2015

(51) Int. Cl.
H04N 19/30    (2014.01)
H04N 19/463    (2014.01)
(Continued)

(52) U.S. Cl.
CPC .......... *H04N 19/30* (2014.11); *H04N 19/463* (2014.11); *H04N 19/80* (2014.11); *H04N 19/82* (2014.11)

(58) Field of Classification Search
CPC .... H04N 19/503; H04N 19/33; H04N 19/117; H04N 19/136; H04N 19/147;
(Continued)

(56) References Cited

U.S. PATENT DOCUMENTS 5,742,343 A * 4/1998 Haskell .................. H04N 19/61
348/487
2008/0159404 A1 7/2008 Hong et al.
(Continued)

FOREIGN PATENT DOCUMENTS

CN    1939066 A    3/2007
CN    101218826 A    7/2008
(Continued)

OTHER PUBLICATIONS

Ken McCann, Woo-Jin Han, and Il-Koo Kim, "Samsung's Response to the Call for Proposals on Video Compression Technology, document JCTVC-A124" Joint Collaborative Team on Video Coding (JC T- VC), Dresden, Germany, 2010.*
(Continued)

*Primary Examiner* — Jamie J Atala
*Assistant Examiner* — Ayman A Abaza
(74) *Attorney, Agent, or Firm* — Schiff Hardin LLP

(57) ABSTRACT

Described herein are techniques related to re-use of filter parameters, and particularly Sample Adaptive Offset (SAO) parameters, of a lower-layer bitstream or a coded enhancement layer bitstream for coding enhancement layer bitstream in a scalable video encoding.

20 Claims, 9 Drawing Sheets

(51) Int. Cl.
*H04N 19/82* (2014.01)
*H04N 19/80* (2014.01)

(58) Field of Classification Search
CPC ...... H04N 19/12; H04N 19/30; H04N 19/463; H04N 19/80; H04N 19/82
USPC .................................................. 375/240.29
See application file for complete search history.

(56) References Cited

U.S. PATENT DOCUMENTS

| | | |
|---|---|---|
| 2010/0046612 A1 | 2/2010 | Sun et al. |
| 2010/0135393 A1 | 6/2010 | Ying Gao et al. |
| 2011/0110418 A1 | 5/2011 | Lu et al. |
| 2012/0177107 A1* | 7/2012 | Fu .......................... H04N 19/61 375/240.03 |
| 2013/0163660 A1* | 6/2013 | Boyce ..................... H04N 19/46 375/240.02 |
| 2014/0003495 A1* | 1/2014 | Chuang .............. H04N 19/0003 375/240.02 |
| 2014/0146891 A1 | 5/2014 | Chuang et al. |

FOREIGN PATENT DOCUMENTS

| | | |
|---|---|---|
| CN | 101438596 A | 5/2009 |
| EP | 2830312 A1 | 1/2015 |
| EP | 2838262 A1 | 2/2015 |
| KR | 10-2012-0033289 A | 4/2012 |
| WO | 2008/083296 A2 | 7/2008 |
| WO | 2013/174254 A1 | 11/2013 |
| WO | 2014/047776 A1 | 4/2014 |

OTHER PUBLICATIONS

International Search Report and Written Opinion received for PCT Application No. PCT/CN2012/081908, dated Jul. 4, 2013, 10 pages.
Office Action received for Korean Patent Application No. 10-2015-7004552, dated Jan. 30, 2016, 2 pages of English Translation and 3 pages of Korean Office Action.
Extended European Search Report received for European Patent Application No. 12885777.8, dated Mar. 10, 2016, 11 pages.
Notice of Allowance received for Korean Patent Application No. 10-2015-7004552, dated Jul. 15, 2016, 4 pages of Notice of Allowance including 1 page of English Translation.
Office Action and Search Report received for Chinese Patent Application No. 201280075375.3, dated Apr. 5, 2017, 13 pages of Chinese Office Action only.
International Preliminary Report on Patentability and Written Opinion Received for PCT Patent Application No. PCT/CN2012/081908, dated Apr. 9, 2015, 6 pages.

* cited by examiner

| Table 1 Total 5 sao types | | |
|---|---|---|
| sao type | saoTypeIDx | description |
| SAO_EO_0 | 0 | 1D 0-degree edge |
| SAO_EO_1 | 1 | 1D 90-degree edge |
| SAO_EO_2 | 2 | 1D 135-degree edge |
| SAO_EO_3 | 3 | 1D 45-degree edge |
| BO | 4 | Band offset |

| Table 2 Total 5 kinds of edge types | | |
|---|---|---|
| edge type | edgeIDx | description |
| ∨ | 1 | c < 2 neighboring pixels |
| ╲─ or ─╱ | 2 | c < 1 neighbor && c ==1 neighbor |
| ╱─ or ─╲ | 3 | c > 1 neighbor && c ==1 neighbor |
| ∧ | 4 | c > 2 neighbors |
| ─ | 0 | None of the above |

FIG. 4

INTER-LAYER SAMPLE ADAPTIVE FILTER PARAMETERS RE-USE FOR SCALABLE VIDEO CODING

BACKGROUND

Video coding is a process of preparing video (video data), where the video is encoded to meet proper formats and specifications for recording and playback. A system of coding may include a video frame source that generates uncompressed video frames. The uncompressed video frames may be coded according to principles of H.264 advance video coding (AVC) standard and transmitted to encoder buffer where the coded frames are sent towards a transmitting medium.

In current scalable coding scheme, the coded frames are generated by using a base layer encoding stage to generate base layer bitstream and an enhancement layer encoding stage to generate enhancement layer coded bitstream, which is a residual signal that represents image information missing in the base layer frames and may therefore be added to the base layer bitstream. In an implementation, a Sample Adaptive Offset (SAO) is an in-loop filter technique adopted into high efficiency video coding (HEVC) standard to improve quality of reconstructed pictures such as during decoding of the coded frames above. SAO filter parameters, including filter control flags, SAO types, offset values, etc., are determined by an encoder and then transmitted to a decoder.

In video coding and compression, a continuing challenge exists to provide methods and processes that minimize the use of resources, such as computational resources. In particular, there is a continuing need to provide resource efficient coding and compression schemes for encoding and decoding such as in the HEVC-SVC standard.

BRIEF DESCRIPTION OF THE DRAWINGS

FIG. 4 tables illustrating Sample Adaptive Offset (SAO) types and edge types in High Efficient Video Coding.

The following Detailed Description is provided with reference to the accompanying figures. In the figures, the left-most digit(s) of a reference number usually identifies the figure in which the reference number first appears. The use of the same reference numbers in different figures indicates similar or identical items.

DETAILED DESCRIPTION

This document discloses one or more systems, apparatuses, methods, etc. for implementing a Sample Adaptive Offset (SAO) filter for scalable video coding (SVC) such as implemented by the High Efficient Video Coding (HEVC) standard. In an implementation, a SVC bitstream may include one base layer and at least one enhancement layer bitstream. In this implementation, a lower layer bitstream may include the base layer or a lower enhancement layer bitstream.

In an implementation, direct re-use SAO filter parameters of the lower-layer bitstream or a coded lower-layer bitstream may be used to encode the enhancement layer bitstream, or re-use only part of the SAO filter parameters of the lower-layer bitstream to encode another enhancement layer bitstream. In this implementation, the re-use of the SAO parameters from the coded lower-layer bitstream to encode the enhancement layer bitstream may be referred to as inter-layer SAO parameter re-use. The inter-layer SAO parameter re-use may improve the SAO filtering process in next generation SVC enhancement layer coding.

Figure 1:
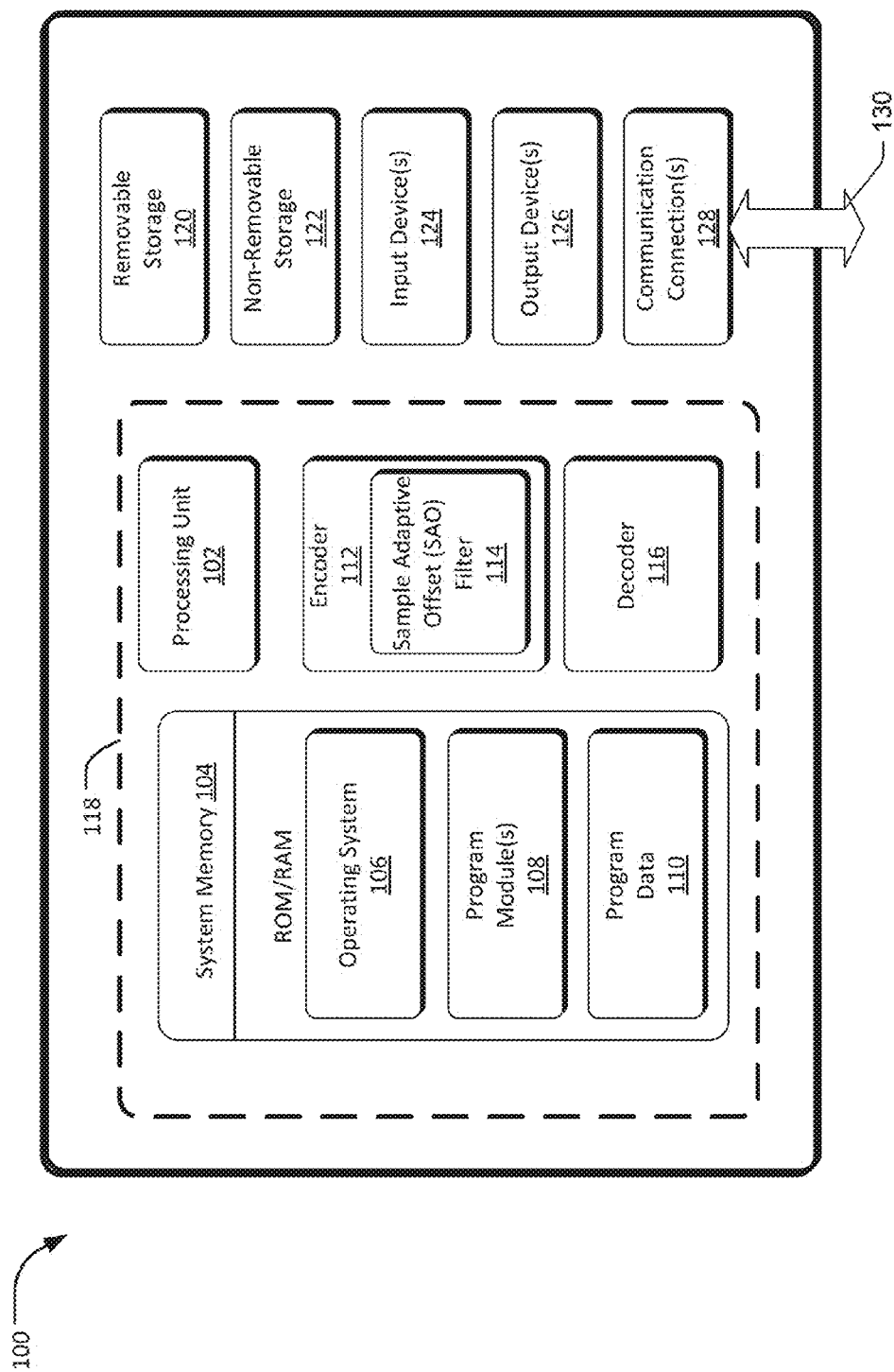
FIG. 1 is an illustrative diagram of an example system for implementing an inter-layer Sample Adaptive Offset (SAO) parameters re-use for scalable video coding (SVC).

FIG. 1 shows an example system/computing device 100 that may be utilized to implement various described embodiments. However, it will be readily appreciated that the techniques disclosed herein may be implemented in other computing devices, systems, and environments. The computing device 100 shown in FIG. 1 is one example of a computing device and is not intended to suggest any limitation as to the scope of use or functionality of the computer and network architectures.

In at least one implementation, computing device 100 includes at least one processing unit 102 and system memory 104. Depending on the exact configuration and type of computing device, system memory 104 may be volatile (such as RAM), non-volatile (such as ROM, flash memory, etc.) or some combination thereof. System memory 104 may include an operating system 106, one or more program modules 108, that in certain implementations may implement the algorithm methods and techniques describe herein. System memory 104 may further include program data 110 which may include macro blocks/shapes database(s) as described later in this document. Furthermore, an encoder 112 is included in this example. The encoder 112 may be used to implement the inter-layer SAO parameter re-use described herein. The encoder 112 may be operatively coupled to and communicate with processing unit 102, system memory 104, and other memory, input/output, devices, further described herein, and other components/devices not shown.

In this example, the encoder 112 includes a Sample Adaptive Offset or SAO filter 114. As further discussed, SAO filter 114 may be used for the enhancement layer bitstream coding, and to directly re-use SAO filter parameters of a lower-layer bit stream or a coded lower layer bitstream to encode another enhancement layer bitstream. In certain cases, SAO filter 114 is used for re-use of only part of the SAO filter parameters of the lower-layer to encode another enhancement layer bitstream. Furthermore, device 100 may include a decoder 116. Example functions of both encoder 112 and decoder 116 are further described below.

A basic implementation of the computing device 100 is demarcated by a dashed line 118. For example, in certain implementations, encoder 112 and/or decoder 116 may be part of an integrated graphics chip set of a central processing units (CPU) that includes 3D and media, having media functionality that includes video, specifically video decode/encode. In certain implementations, an application specific integrated circuit or ASIC may include the encoder 112 and/or decoder 116 as a fixed function encoder/decoder It is contemplated that devices with video encoding may make use of the techniques, methods, and devices described. Examples of such devices include media players, video conferencing devices, etc.

In certain implementations, program modules 108 may include specific modules (not shown) such as a codec or software/firmware based encoder, configured to implement the video encoding techniques and methods described herein. For example, such modules in certain implementations may perform the processes of encoder 112. Example codecs include AVC, VC1, and SVC.

Computing device 100 may have additional features or functionality. For example, computing device 100 may also include additional data storage devices such as removable storage 120 and non-removable storage 122. In certain implementations, the removable storage 120 and non-removable storage 122 are an example of computer accessible media for storing instructions that are executable by the processing unit 102 to perform the various functions described above. Generally, any of the functions described with reference to the figures may be implemented using software, hardware (e.g., fixed logic circuitry) or a combination of these implementations. Program code may be stored in one or more computer accessible media or other computer-readable storage devices. Thus, the processes and components described herein may be implemented by a computer program product. As mentioned above, computer accessible media includes volatile and non-volatile, removable and non-removable media implemented in any method or technology for storage of information, such as computer readable instructions, data structures, program modules, or other data. The terms "computer accessible medium" and "computer accessible media" refer to non-transitory storage devices and include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium that may be used to store information for access by a computing device, e.g., computing device 100. Any of such computer accessible media may be part of the computing device 100.

In one implementation, the removable storage 120, which is a computer accessible medium, has a set of instructions stored thereon. When executed by the processing unit 102, the set of instructions cause the processing unit 102 to execute operations, tasks, functions and/or methods as described herein, and any variations thereof.

Computing device 100 may also include one or more input devices 124 such as keyboard, mouse, pen, voice input device, touch input device, etc. Computing device 100 may additionally include one or more output devices 126 such as a display, speakers, printer, etc.

Computing device 100 may also include one or more communication connections 128 that allow the computing device 100 to communicate by wire or wirelessly with one or more other devices (not shown), over connection 130. It is appreciated that the illustrated computing device 100 is one example of a suitable device and is not intended to suggest any limitation as to the scope of use or functionality of the various embodiments described.

Figure 2:
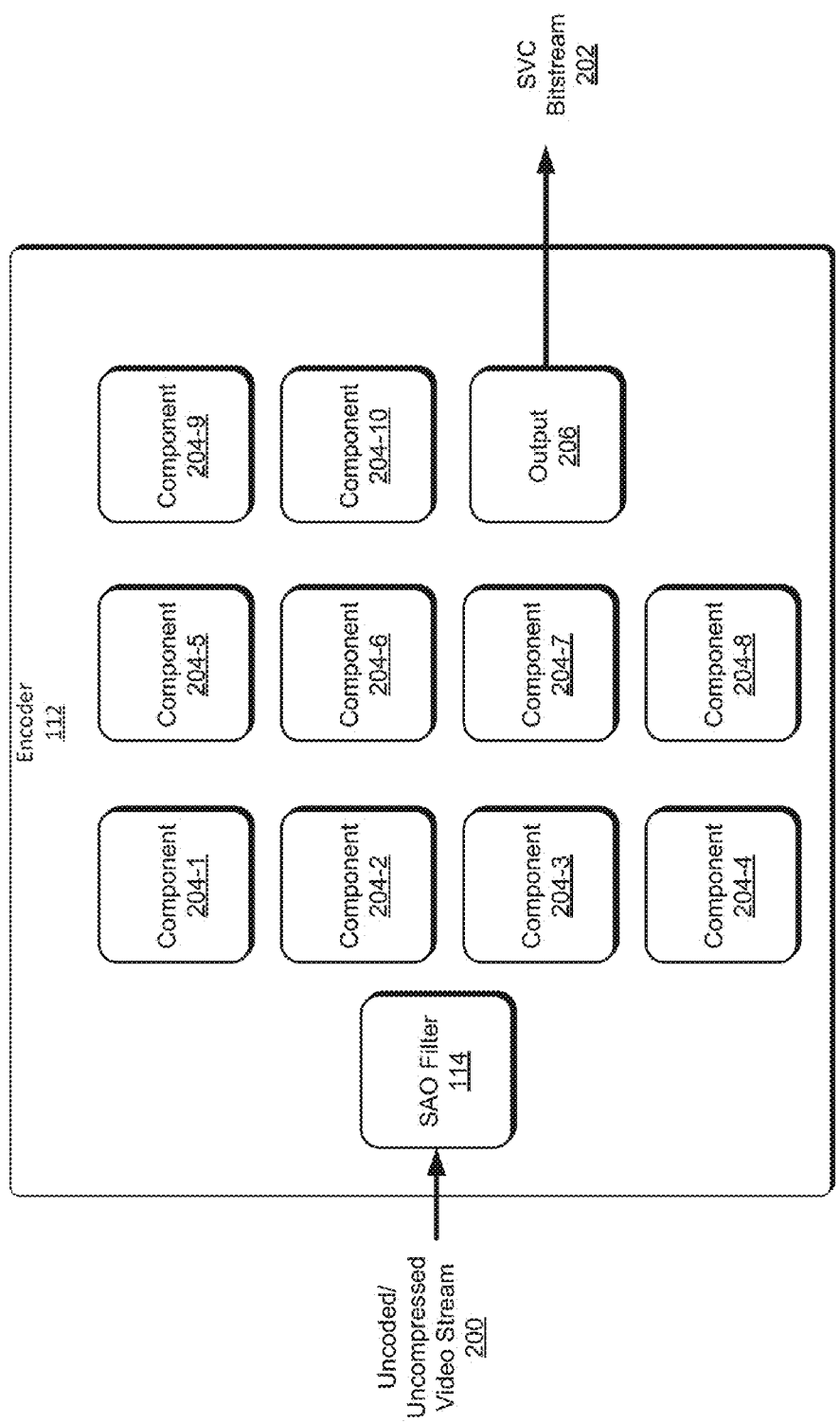
FIG. 2 is an illustrative diagram of an example video encoder for implementing an inter-layer Sample Adaptive Offset (SAO) parameters re-use for scalable video coding (SVC).

FIG. 2 shows an example video encoder 112 that implements the SAO filter 114 for HEVC-SVC standard for enhancement layer bitstream coding, and directly re-use SAO filter parameters of the lower-layer or the coded enhancement layer bitstream to encode another enhancement layer bitstream, or re-use only part of the SAO filter parameters of the lower-layer to encode another enhancement layer bitstream. In certain implementations, the video encoder 112 may be implemented as part of a central processing unit, part of integrated circuit chipset, or as a separate component/device. As discussed above, in certain implementations, the video encoder 112 may be implemented as firmware or software, such as a codec. Furthermore, FIG. 2 is merely illustrative and may contain additional blocks or components and/or different arrangement of the blocks or components.

As discussed, there are multiple layer bitstreams in the SVC system, known as or designated as the base-layer and the enhancement layer bitstreams. The base-layer bitstream is coded using for example, a HEVC standard encoder (e.g., encoder 112) and the base layer bitstream may be decoded independently to reconstruct a base layer video output (not shown). On the other hand, the enhancement layer bitstream may be coded using for example, HEVC-SVC coding tools and decoded together with the lower-layer data to construct an enhancement layer output video (not shown).

In an implementation, an inter-layer coding tool for coding the enhancement layer bitstream includes inter-layer motion-compensated prediction (MCP), which is added as an alternative to intra-layer motion-compensated prediction. Intra-layer MCP may refer to an inter picture prediction that uses preexisting coded pictures of the same layer, while inter-layer MCP may refer to an inter picture prediction that uses preexisting coded pictures of other layers.

In an implementation, the video encoder 112 may receive un-encoded and/or un-compressed video 200 that includes image frames to be encoded to generate corresponding encoded frames in the form of an SVC bit stream 202. In this implementation, one or more components or blocks of the video encoder 112 may be configured to perform SVC encoding consistent with one or more standards and the processes and techniques describe herein.

For example, the video encoder 112 includes one or more of the following components. It is to be understood that other components may be included, and that the components may be combined (i.e., functionality of components combined). Furthermore, reference to a coding unit or CU may be directed to a portion, or slice of a picture to be coded.

1) Component 204-1 may be a mechanism to apply the SAO filter 114 to improve quality of SVC enhancement layer reconstructions.

2) Component 204-2 may be a mechanism to re-use the SAO parameters from already coded lower-layer picture to encode an enhancement layer picture, which may be called inter-layer SAO parameter re-use. In an implementation, the SAO parameters may include SAO control flags, SAO types, SAO offset values, etc., and the re-use may be implemented at picture level, slice level, or coding unit level. In this implementation, the lower layer picture may be the one that is captured and at the same time instance with the current enhancement layer picture; or the lower layer picture is captured at different time instances with the current enhancement layer picture.

3) Component 204-3 may be a mechanism to directly re-use the SAO parameters of the lower-layer picture to encode the enhancement layer picture.
4) Component 204-4 may be a mechanism to directly re-use part of the SAO parameters from the lower-layer picture to encode the enhancement layer picture, and let the encoder 112 generate the other part of the SAO parameters for the enhancement layer picture and send the generated parameters to decoder. For example, re-use only the SAO control flag and SAO type from the lower layer picture, but re-generate new SAO offset values for the enhancement layer picture
5) Component 204-5 may be a mechanism not to re-use the SAO parameters from the lower-layer picture but let the encoder 112 generate all SAO parameters for current enhancement layer picture and send the generated parameters to decoder.
6) Component 204-6 may be a mechanism to let the encoder 112 adaptively decides whether to re-use the SAO parameters from the lower layer picture, and then send a decision flag to the decoder. The decision flag may be a sequence level flag, a GOP level flag, a slice level flag, or a coding unit level flag. In an implementation, three video components i.e. Y, Cb and Cr may share the same decision flag or may include separate and individual decision flags.
7) Component 204-7 may be a mechanism to apply different SAO parameter re-use schemes for Y, Cb and Cr components, e.g., apply adaptive re-use to Y component but apply mandatory re-use for Cb and Cr components, or vice versa.
8) Component 204-8 may be a mechanism to re-use or partly re-use the SAO parameters from a spatial or temporal neighboring coded coding unit to encode the current coding unit in the enhancement layer picture, which may be referred to as intra-layer SAO parameter re-use. The spatial neighbor coding unit may be left neighbor coding unit, top neighbor coding unit, top-left neighbor coding unit, or other available coded spatial neighbor coding units. The temporal neighbor coding unit may be a collocated coding unit in an intra-layer reference frame, or a coding unit in the intra-layer reference frame pointed by a motion vector. In one embodiment, the encoder 112 may decide which neighboring coding unit should be used and then send the decision result to the decoder.
9) Component 204-9 may be a mechanism to let the encoder 112 adaptively decides to apply intra-layer or inter-layer SAO parameters re-use, and then send a flag to the decoder to indicate the decision of the encoder 112.
10) Component 204-10 may be a mechanism to apply the inter-layer or intra-layer SAO parameter re-use based on a prediction mode of the coding unit. For example, if the coding unit is intra-layer predicted, then apply intra-layer SAO parameter re-use. If the coding unit is inter-layer predicted, then apply inter-layer SAO parameter re-use. In this case, no flag is needed and the decoder may decide to use which kind of re-use scheme based on the decoded prediction mode of the coding unit.
11) Output 206 may include a buffer component for the SVC bitstream 202 that may include the base layer and enhancement layer bitstreams.

Figure 3:
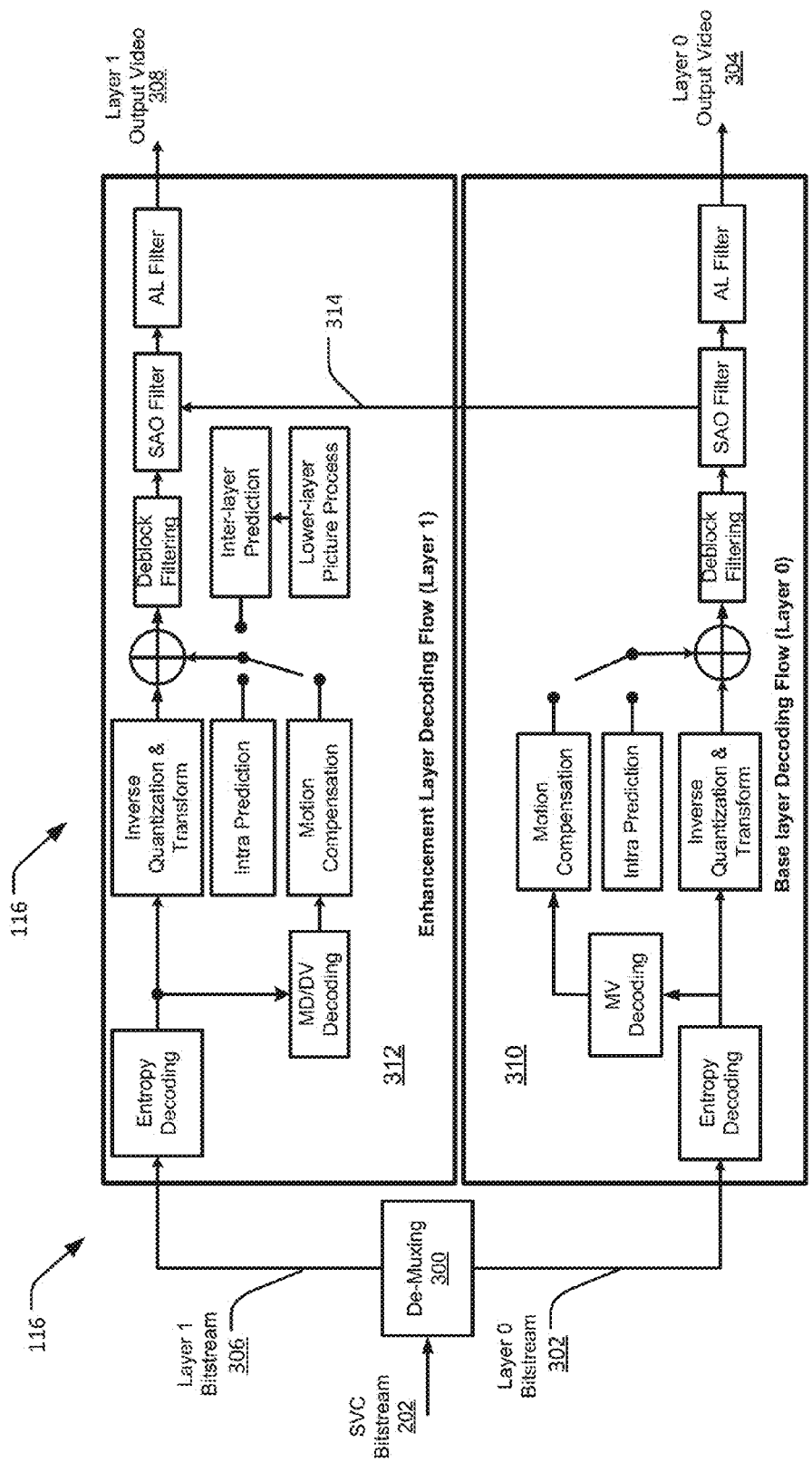
FIG. 3 is an illustrative diagram of an example video decoder for implementing an inter-layer Sample Adaptive Offset (SAO) parameters re-use for scalable video coding (SVC).

FIG. 3 shows an example video decoder 116 of a two-layer SVC bitstream. In an implementation, the video decoder receives the SVC bitstream 202 and performs de-multiplexing of the SVC bitstream 202 through a de-mux 300 to provide a separate layer zero (0) bitstream for the base layer and a layer one (1) bitstream for the enhancement layer. In this implementation, a layer zero (0) 302 bitstream may be independently decoded to reconstruct a base layer 0 output video 304, while a layer 1 306 may be decoded together with the base layer reconstructed output video 304 to provide a reconstructed layer 1 output video 308.

In an implementation, a base layer decoding flow block 310 processes the layer 0 bitstream 302, and an enhancement layer decoding flow block 312 processes the layer 1 bitstream 306. For HEVC standard based SVC, the layer 0 bitstream 302 may be decoded by an HEVC decoder.

In an implementation, the layer 1 bitstream stream 306 may not be independently decoded to reconstruct the layer 1 output video 308. The layer 1 bitstream stream 306 is decoded together with the layer 0 bitstream reconstructed output video 304 because inter-layer prediction may be used for the encoding of other enhancement layer coding units.

In an implementation, the layer 0 bitstream 302 may be processed before being applied for the inter-layer prediction. For example, the layer 0 bitstream 302 is first processed before processing the layer 1 bitstream 306 using inter-layer SAO parameter re-use. In an implementation, the "process" may include picture up-sampling for spatial scalability, picture tone mapping for bit-depth scalability, de-interlacing for interlace-progressive scalability, or some other kind of processing.

With continuing reference to FIG. 3, an inter-layer SAO parameter re-use is illustrated by a line 314 that connects the SAO filter at the base layer decoding flow 310 to the SAO filter of the enhancement layer decoding flow 312. In an implementation, the decoded SAO parameters of the layer 0 302 bitstream or the lower enhancement layer coding unit may be used as the SAO parameters of the enhancement layer coding unit to decode the layer 1 bitstream 306.

In an implementation, in applying the SVC, for each layer 0 302 or 1 306 bitstreams, the SAO may be conditionally performed after a de-blocking filter in order to improve both objective and subjective quality of the reconstructed signal. In this implementation, the SAO filtering for the lower-layer and the enhancement layer bitstreams may be performed using individual SAO parameters.

In an implementation, the SAO may be used to classify reconstructed pixels into different categories and then reduce distortion by adding an offset to luma and/or chroma components for each category of pixels. For example, an offset table may be added to a particular category and the offset table is to be determined at the encoder 112 and transmitted to the decoder 116. Particular implementations provide that the encoder 112 and the decoder 116 reside at different devices, and that the SVC bit stream 202 may be transmitted from the encoder 112 to the decoder 116.

FIG. 4, Table 1 illustrates 5 different SAO types while FIG. 4, table 2 shows an example of 5 different kinds of edge types.

In an implementation, the SAO filtering at the encoder 112 side may be implemented as follows:
1) Divide a picture into largest coding unit (LCU)-aligned regions. In HEVC, one LCU is equivalent to one region.
2) Classify each region into different SAO types via rate distortion optimization (RDO) process. In this implementation, there are 5 possible SAO types denoted by "saoTypeIdx", as shown in Table 1 of FIG. 4.
3) For a specific region
  a) if "saoTypeIdx"=4
   i) Classify pixels into different band types according to pixel's intensity. The intensity from 0 to 255 is equally divided into 32 band types, denoted by "bandIdx." For example, there is an offset table with 4 offset values for successive 4 bands transmitted for a specific region.

Meanwhile. "sao_band_position" is used to signal the first band that SAO will be applied. Therefore, a specific offset value can be derived for each pixel according to its band type.

ii) For each pixel, add the offset value to the original pixel value.

b) Else, if "saoTypeIdx"=0, 1, 2, or 3 i) Compute edge type for each pixel. In this example, there are 5 kinds of edge types for each edge offset (EO) type, denoted by "edgeIdx", as shown in Table 2. The offset value is obtained for a specific pixel according to its edge type.

ii) For each pixel, add the offset value to the original pixel value.

c) Else, do not perform SAO.

In an implementation, the SAO filtering at the decoder 116 side may be implemented as follows:

1) For all pixels in a specific region, perform per-pixel SAO filtering.
2) Each region receives a "saoTypeIdx" to indicate which SAO type it belongs to. "saoTypeIdx=4", the current region will also receive a band Position.
3) For each pixel in a specific region
   a) if saoTypeIdx"=0, 1, 2, or 3, compute its "edgeIdx" and add the received offset of the edge type to the pixel value.
   b) Else if "saoTypeIdx"=4, compute its band Idx and add the received offset of the band type to the pixel value.
   c) Else, do not perform SAO.

Figure 5:
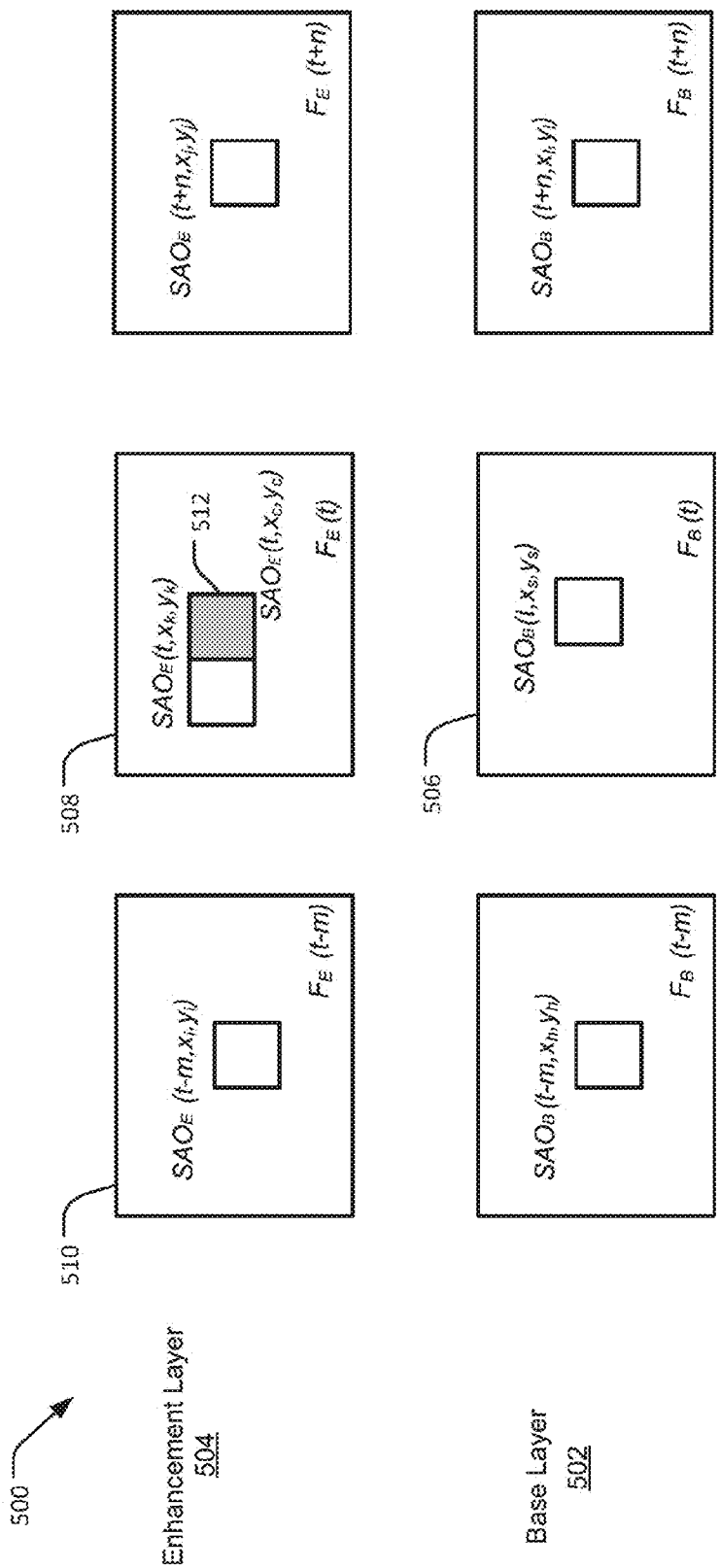
FIG. 5 is an illustrative diagram for possible reference coding units whose Sample Adaptive Offset (SAO) parameters are re-used to encode the current coding unit in current frame.

FIG. 5 shows a mapping 500 between a coding unit in a base layer bitstream 502 and coding units in enhancement layer bitstream 504. In an implementation, SAO filtering for enhancement layer bitstream 504 may utilize different SAO parameters such as SAO control flags, SAO types, SAO offset values, SAO band positions, etc. that may be partially or fully inherited from the lower layer 502. For example, a) copying only the SAO control flag and SAO type from the lower layer 502 for the enhancement layer 504; or b) copying all the SAO parameters including SAO control flags, SAO types, SAO offset values, and/or SAO band positions, etc., from the lower layer 502 for the enhancement layer 504. In an implementation, the SAO parameters that may be re-used and/or inherited may be defined in the standard specification in order for the encoder 112 and decoder 116 to use the same SAO parameters.

In an implementation, when re-using SAO parameters for the enhancement layer coding unit (i.e., at enhancement layer 504), multiple corresponding coding units from spatial, temporal and inter-layer neighbor coding units may be used to generate the inherited SAO parameters as illustrated in FIG. 3. For example, $f_B(t)$ stands for a base layer picture 506 at time t; $f_E(t)$ stands for an enhancement layer picture 508 at time t; $SAO_B(t, x, y)$ stands for the SAO parameters of a coding unit positioned at (x, y) in the base layer picture $f_B(t)$ 506, and $SAO_E(t, x, y)$ stands for the SAO parameters of a coding unit positioned at (x, y) in the enhancement layer picture $f_E(t)$ 508.

In an implementation, assuming that a gray coding unit in the enhancement coding picture $f_E(t-m)$ 510 is a coded enhancement layer picture prior to current enhancement picture at time t−m; and:

a) $f_E(t+n)$ is a coded enhancement layer picture after current enhancement picture at time t+n;
b) $f_B(t-m)$ is a base layer or lower-enhancement-layer picture at time t;
c) $f_B(t-m)$ is a coded base layer or tower-enhancement-layer picture prior to $f_B(t)$ at time (t−m); and d) $f_B(t+n)$ is a coded base layer or lower-enhancement-layer picture after $f_B(t)$ at time (t+n), then the SAO parameters of following listed coding units may be re-used to encode current enhancement layer coding unit 512, indicated as $SAO_E(t, x_c, y_c)$:

Spatial neighbor coding unit in $f_E(t)$: $SAO_E(t, x_k, y_k)$. The spatial neighbor coding unit may include the left, top, top-left or top-right coded neighboring coding unit to current coding unit;

Temporal neighbor coding unit from $f_E(t-m)$: $SAO_E(t-m, x_i, y_i)$;

Temporal neighbor coding unit from $f_E(t+n)$: $SAO_E(t+n, x_j, y_j)$;

Inter-layer neighbor coding unit from $f_B(t)$: $SAO_B(t, x_s, y_s)$;

Temporal inter-layer coding unit from $f_B(t-m)$: $SAO_B(t-m, x_h, y_h)$; and

Temporal inter-layer coding unit from $f_B(t+m)$: $SAO_B(t+m, x_i, y_i)$.

Consistency should exist as to providing the standard specification as to which block is selected and what kind of SAO information should be inherited, so that the encoder and decoder may produce the same SAO filtering. A corresponding block in the reference frame may be derived by different methods using known information such as block location, coded intra-layer/inter-layer motion vector, etc. For example, the corresponding coding unit could be (a) the collocated coding unit in the intra-layer/inter-layer bitstream reference frame with the same location of current coding unit; (h) the intra-layer/inter-layer motion-compensated coding unit using preexisting coded intra-layer/inter-layer motion vector etc.

In addition, since the intra-layer/inter-layer bitstream corresponding coding unit may overlap multiple blocks due to the block-based prediction, various methods may be used such as dominant overlapped block to represent the corresponding block.

In the above description of example implementations, for purposes of explanation, specific numbers, materials configurations, and other details are set forth in order to better explain the present invention, as claimed. However, it will be apparent to one skilled in the art that the claimed invention may be practiced using different details than the example ones described herein. In other instances, well-known features are omitted or simplified to clarify the description of the example implementations.

The inventors intend the described example implementations to be primarily examples. The inventors do not intend these example implementations to limit the scope of the appended claims. Rather, the inventors have contemplated that the claimed invention might also be embodied and implemented in other ways, in conjunction with other present or future technologies.

As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more," unless specified otherwise or clear from context to be directed to a singular form.

These processes are illustrated as a collection of blocks in a logical flow graph, which represents a sequence of operations that may be implemented in mechanics alone or a combination with hardware, software, and/or firmware. In the context of software/firmware, the blocks represent instructions stored on one or more computer-readable storage media that, when executed by one or more processors, perform the recited operations.

Note that the order in which the processes are described is not intended to be construed as a limitation, and any number of the described process blocks may be combined in any order to implement the processes or an alternate process. Additionally, individual blocks may be deleted from the processes without departing from the spirit and scope of the subject matter described herein.

Based on the high correlation between neighboring views, the SAO parameters between current coding unit and the corresponding coding unit in the inter-layer bitstream reference frame may be very similar. By using the proposed SAO parameters re-use method, the proposed methods and techniques may save bits (i.e., processing of video) for indicating the SAO information. As discussed, the methods and techniques may be performed at the encoder 112 and decoder 116. In certain implementations, flags may be set and provided from the encoder 112 to decoder 116 to indicate whether to use such SAO parameter re-use.

Figure 6A:
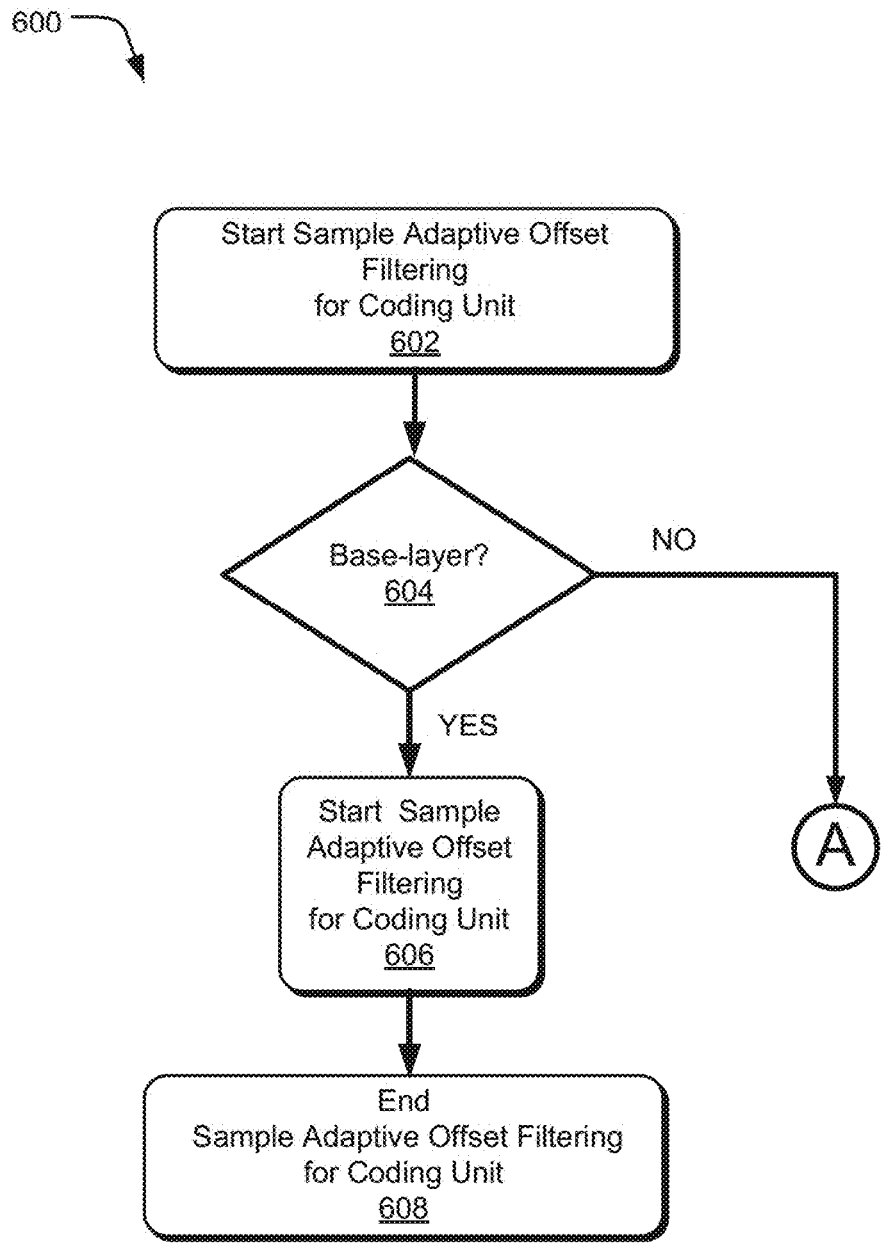
FIGS. 6A and 6B is a flow chart of an example process for an inter-layer Sample Adaptive Offset (SAO) parameters re-use for scalable video coding (SVC).
Figure 6B:
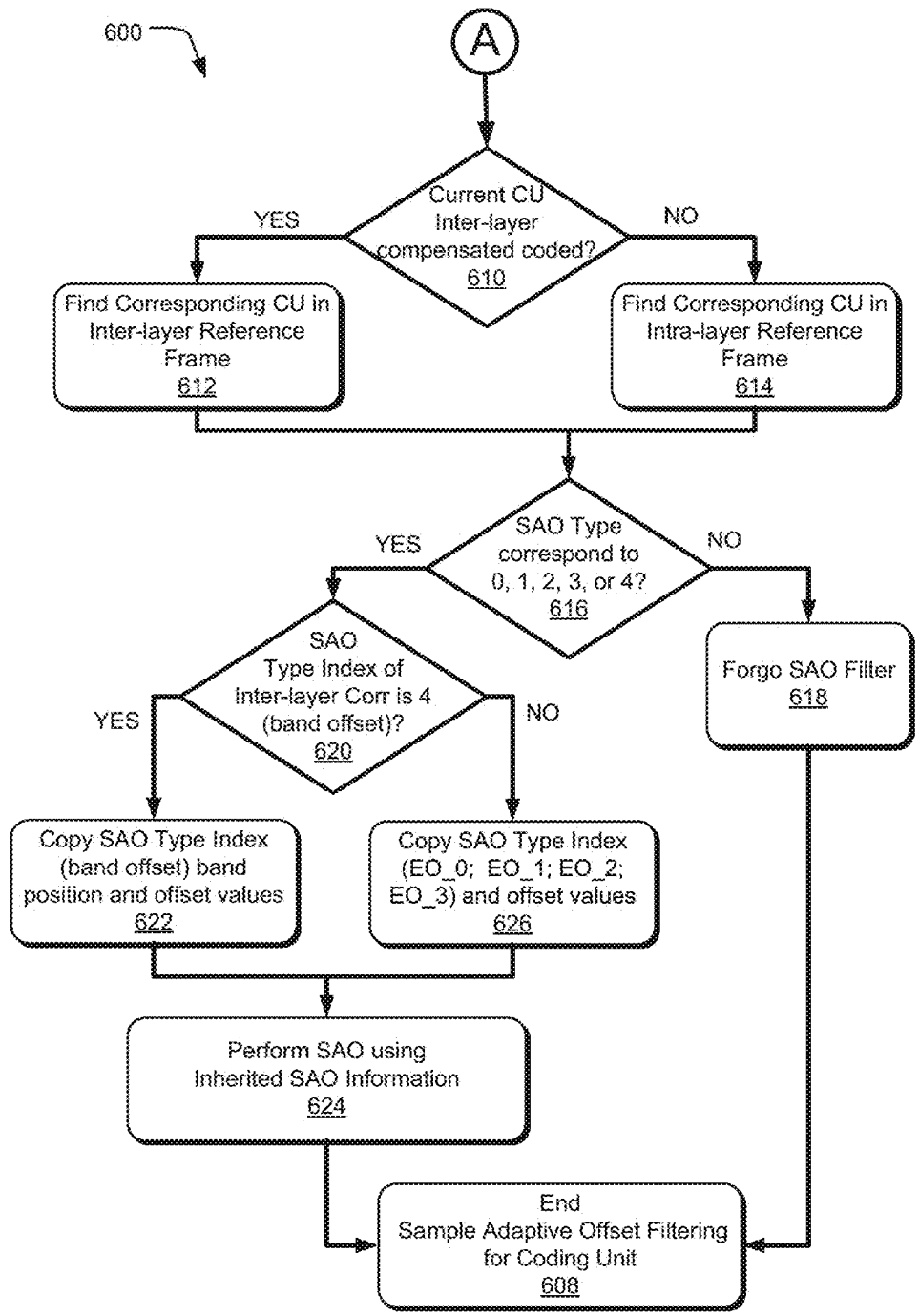

FIG. 6 shows an example process flowchart 600 illustrating an example method for inter-layer SAO parameters re-use. This is based on the basic unit of the SAO parameter re-use process and techniques being a coding unit or CU. Each picture may be divided into CUs before encoding and decoding. When performing the SAO parameter re-use process and techniques, first find the corresponding CU in the reference frame, and second re-use the SAO information such as the SAO filter control flag, saoTypeIdx, band position, and offset values from corresponding CU to encode the current CU.

At block 602, for a current coding unit (CU), SAO filtering is performed. A determination is made if the current CU is from a base-layer bitstream. If the determination is "YES", following the YES branch of block 604, then at block 606, SAO filtering for the CU is performed. This may be a traditional SAO filter process in HEVC standard which is applied to the current CU.

If the current CU is not the base-layer bitstream, i.e., the current CU is an enhancement layer bitstream, then following the NO branch of block 604, then SAO re-use (e.g., inter-layer SAO parameters re-use) is applied to the current CU. If the current CU in the enhancement layer bitstream is coded with inter-layer motion compensation, then following YES branch of block 610, the SAO parameters of the reference CU from inter-layer bitstream reference frame are re-used for filtering current CU. Otherwise, the SAO parameters of the reference frame from intra-layer bitstream reference frame are re-used for filtering current CU at block 614.

If the SAO type (see table 1 of FIG. 5), is not in the range of [0, 4], then following the NO branch 616, at block 618 no SAO filtering is performed. This may indicate that SAO filtering is disabled. In other words, there will be no SAO filtering for the current CU.

If the SAO type (see table 1 of FIG. 5), is in the range of [0, 4], SAO filtering is performed. If SAO type is 4, the following the YES branch of block 620, at block 622, and at block 624 the band position and offset values are re-used to filter current CU. Otherwise, if SAO type is not 4, then edge offset type and offset values are re-used to filter the current CU.

Figure 7:
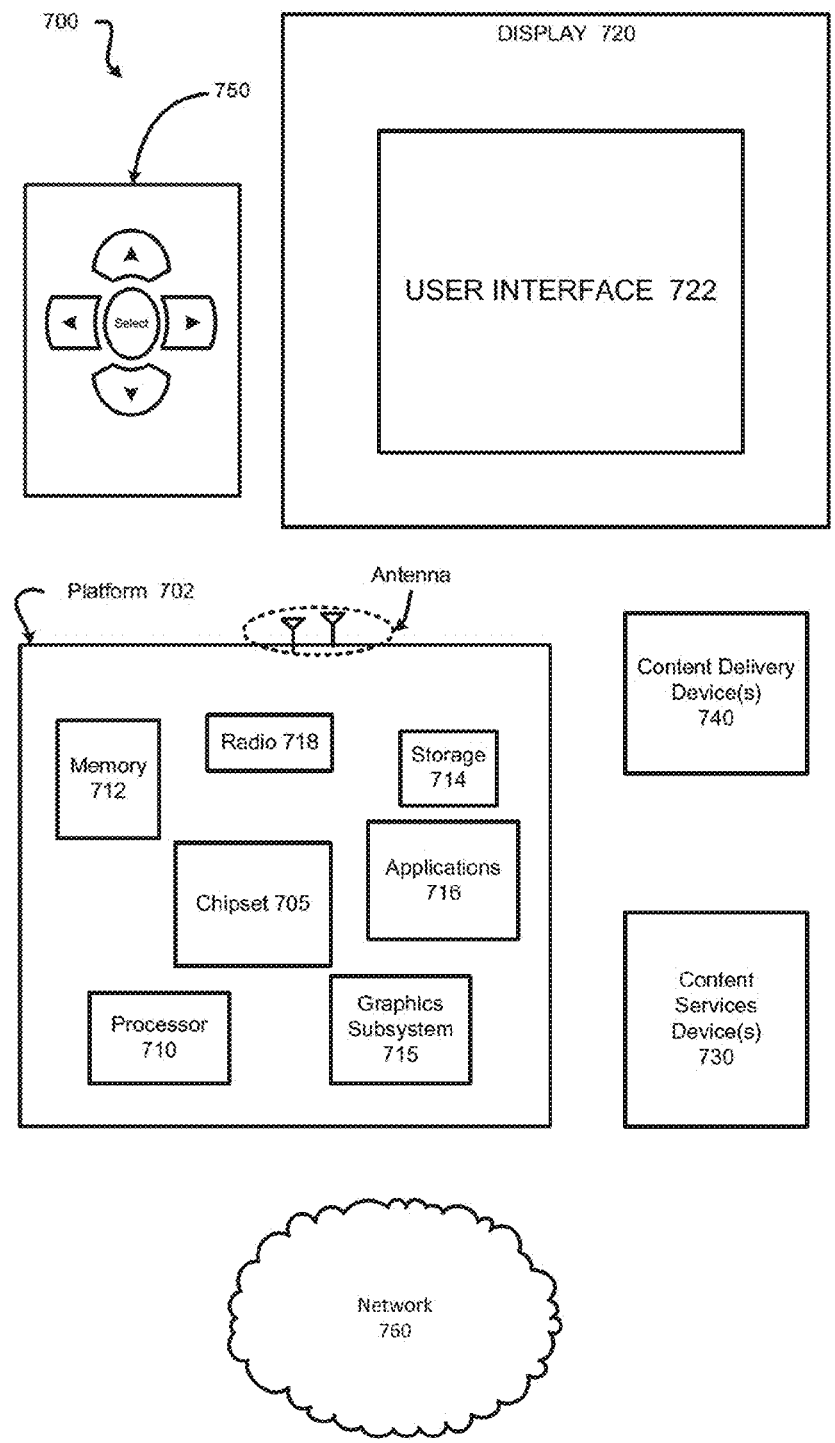
FIG. 7 is an illustrative diagram of an example system that implements Sample Adaptive Offset (SAO) re-use for three dimension video.

FIG. 7 illustrates another example system 700 in accordance with the present disclosure. In various implementations, system 700 may be a media system although system 700 is not limited to this context. For example, system 700 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In various implementations, system 700 includes a platform 702 coupled to a display 720. Platform 702 may receive content from a content device such as content services device(s) 730 or content delivery device(s) 740 or other similar content sources. A navigation controller 750 including one or more navigation features may be used to interact with, for example, platform 702 and/or display 720. Each of these components is described in greater detail below.

In various implementations, platform 702 may include any combination of a chipset 705, processor 710, memory 712, storage 714, graphics subsystem 715, applications 716 and/or radio 718. Chipset 705 may provide intercommunication among processor 710, memory 712, storage 714, graphics subsystem 715, applications 716 and/or radio 718. For example, chipset 705 may include a storage adapter (not depicted) capable of providing intercommunication with storage 714.

Processor 710 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 710 may be dual-core processor(s), dual-core mobile processor(s), and so forth.

Memory 712 may be implemented as a volatile memory device such as, but not limited to, a Random Access Memory (RAM), Dynamic Random Access Memory (DRAM), or Static RAM (SRAM).

Storage 714 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 714 may include technology to increase the storage performance enhanced protection for valuable digital media when multiple hard drives are included, for example.

Graphics subsystem 715 may perform processing of images such as still or video for display. Graphics subsystem 715 may be a graphics processing unit (GPU) or a visual processing unit (VPU), for example. An analog or digital interface may be used to communicatively couple graphics subsystem 715 and display 720. For example, the interface may be any of a High-Definition Multimedia Interface, DisplayPort, wireless HDMI, and/or wireless HD compliant techniques. Graphics subsystem 715 may be integrated into processor 710 or chipset 705. In some implementations, graphics subsystem 715 may be a stand-alone card communicatively coupled to chipset 705.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 718 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 718 may operate in accordance with one or more applicable standards in any version.

In various implementations, display 720 may include any television type monitor or display. Display 720 may include, for example, a computer display screen, touch screen display, video monitor, television-like device, and/or a television. Display 720 may be digital and/or analog. In various implementations, display 720 may be a holographic display. Also, display 720 may be a transparent surface that may receive a visual projection. Such projections may convey various forms of information, images, and/or objects. For example, such projections may be a visual overlay for a mobile augmented reality (MAR) application. Under the control of one or more software applications 716, platform 702 may display user interface 722 on display 720.

In various implementations, content services device(s) 730 may be hosted by any national, international and/or independent service and thus accessible to platform 702 via the Internet, for example. Content services device(s) 730 may be coupled to platform 702 and/or to display 720. Platform 702 and/or content services device(s) 730 may be coupled to a network 760 to communicate (e.g., send and/or receive) media information to and from network 760. Content delivery device(s) 740 also may be coupled to platform 702 and/or to display 720.

In various implementations, content services device(s) 730 may include a cable television box, personal computer, network, telephone, Internet enabled devices or appliance capable of delivering digital information and/or content, and any other similar device capable of unidirectionally or bidirectionally communicating content between content providers and platform 702 and/display 720, via network 760 or directly. It will be appreciated that the content may be communicated unidirectionally and/or bidirectionally to and from any one of the components in system 700 and a content provider via network 760. Examples of content may include any media information including, for example, video, music, medical and gaming information, and so forth.

Content services device(s) 730 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 702 may receive control signals from navigation controller 750 having one or more navigation features. The navigation features of controller 750 may be used to interact with user interface 722, for example. In embodiments, navigation controller 750 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 750 may be replicated on a display (e.g., display 720) by movements of a pointer, cursor, focus ring, or other visual indicators displayed on the display. For example, under the control of software applications 716, the navigation features located on navigation controller 750 may be mapped to virtual navigation features displayed on user interface 722, for example. In embodiments, controller 750 may not be a separate component but may be integrated into platform 702 and/or display 720. The present disclosure, however, is not limited to the elements or in the context shown or described herein.

In various implementations, drivers (not shown) may include technology to enable users to instantly turn on and off platform 702 like a television with the touch of a button after initial boot-up, when enabled, for example. Program logic may allow platform 702 to stream content to media adaptors or other content services device(s) 730 or content delivery device(s) 740 even when the platform is turned "off." In addition, chipset 705 may include hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various implementations, any one or more of the components shown in system 700 may be integrated. For example, platform 702 and content services device(s) 730 may be integrated, or platform 702 and content delivery device(s) 740 may be integrated, or platform 702, content services device(s) 730, and content delivery device(s) 740 may be integrated, for example. In various embodiments, platform 702 and display 720 may be an integrated unit. Display 720 and content service device(s) 730 may be integrated, or display 720 and content delivery device(s) 740 may be integrated, for example. These examples are not meant to limit the present disclosure.

In various embodiments, system 700 may be implemented as a wireless System, a wired system, or a combination of both. When implemented as a wireless system, system 700 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 700 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 702 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through system, or instruct a node to process the media information in a predetermined manner. The embodiments, however, are not limited to the elements or in the context shown or described in FIG. 7.

Figure 8:
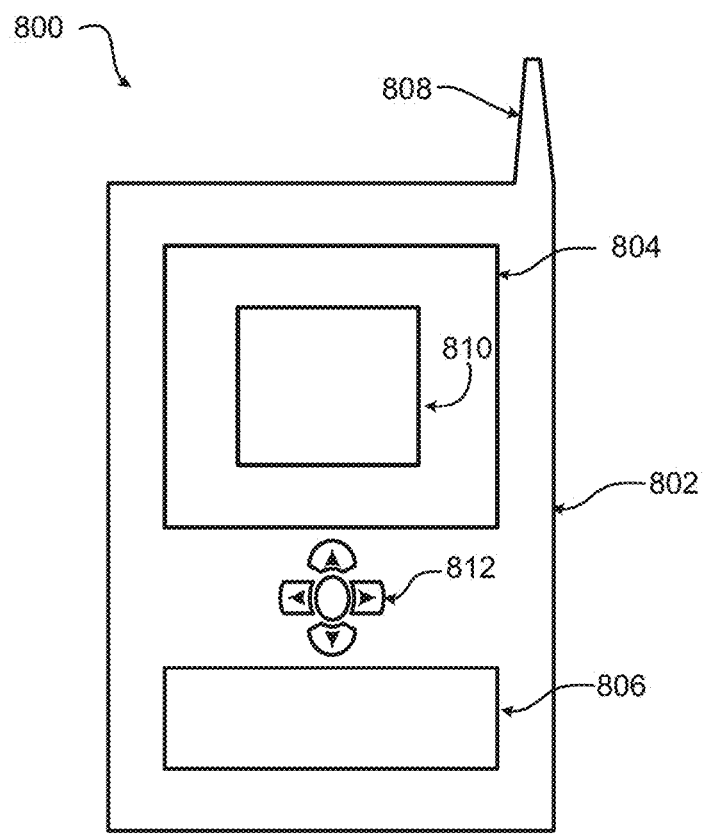
FIG. 8 is an illustrative diagram of an example device, all arranged in accordance with at least some implementations of present disclosure.

As described above, system 700 may be embodied in varying physical styles or form factors. FIG. 8 illustrates implementations of a small form factor device 800 in which system 700 may be embodied. In embodiments, for example, device 800 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 8, device 800 may include a housing 802, a display 804, an input/output (I/O) device 806, and an antenna 808. Device 800 also may include navigation features 812. Display 804 may include any suitable display unit for displaying information appropriate for a mobile computing device. I/O device 806 may include any suitable I/O device for entering information into a mobile computing device. Examples for I/O device 806 may include an alphanumeric keyboard, a numeric keypad, a touch pad, input keys, buttons, switches, rocker switches, microphones, speakers, voice recognition device and software, and so forth. Information also may be entered into device 800 by way of microphone (not shown). Such information may be digitized by a voice recognition device (not shown). The embodiments are not limited in this context.

Various embodiments may be implemented using hardware elements, software elements, or a combination of both. Examples of hardware elements may include processors, microprocessors, circuits, circuit elements e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

Realizations in accordance with e present invention have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the various configurations may be implemented as a combined structure or component. These and other variations, modifications, additions, and improvements may fall within the scope of the invention as defined in the claims that follow.

What is claimed is:

1. A video decoder that processes a scalable video coding (SVC) bitstream, comprising:
   a demultiplexer configured to receive the SVC bitstream and separate the SVC bitstream into a base layer bitstream and one or more enhancement layer bitstreams, wherein a prediction mode of a coding unit of the base layer bitstream is used as a reference to decode the received one or more enhancement layer bitstreams
   base layer bitstream decoding circuitry configured to process the received base layer bitstream, the processing of the received base layer bitstream including decoding of the reference prediction mode of the coding unit of the base layer bitstream; and
   enhancement layer bitstream decoding circuitry configured to decode the received enhancement layer bitstream to provide an enhancement layer output by (i) performing inter-layer sample adaptive offset (SAO) filter parameter re-use when the decoded prediction mode of the coding unit of the base layer bitstream or a lower enhancement layer bitstream indicates inter-layer coding, and (ii) performing intra-layer SAO filter parameter re-use when the decoded prediction mode of the coding unit of the base layer bitstream or a lower enhancement layer bitstream indicates intra-layer coding, wherein the enhancement layer bitstream decoding circuitry is further configured to, when performing the inter-layer SAO filter parameter re-use, utilize the decoded prediction mode of the coding unit of the base layer bitstream or the lower enhancement layer bitstream instead of utilizing an SAO control flag included in the SAO filter parameters.

2. The video decoder of claim 1, wherein the base layer bitstream is decoded independently while an enhancement layer bitstream from among the one or more enhancement layer bitstreams is decoded together with one of the base layer or the lower enhancement layer outputs.

3. The video decoder of claim 1, wherein the enhancement layer bitstream decoding circuitry receives the prediction mode from the base layer bitstream decoding circuitry.

4. The video decoder of claim 1, wherein part of the SAO filter parameter of the lower enhancement layer bitstream is directly re-used to decode an enhancement layer bitstream from among the one or more enhancement layer bitstreams, and the video decoder adapts other SAO filter parameters that were generated by a video encoder to encode the enhancement layer bitstream.

5. The video decoder of claim 1, wherein the SAO filter parameters are of a spatial, temporal, or lower-layer neighbor coded coding unit and used to decode a current coding unit in an enhancement layer bitstream from among the one or more enhancement layer bitstreams.

6. The video decoder of claim 1, wherein the SAO filter parameters includes inherited SAO filter parameters from the base layer bitstream or the lower enhancement layer bitstream to include multiple corresponding coding units from spatial, temporal, and inter-layer neighbor coding units.

7. A device, comprising:
one or more processors;
a memory coupled to the processors;
a video encoder coupled to the processors and memory, the video encoder configured to generate a scalable video coding (SVC) bitstream including one or more enhancement layer bitstreams and a base-layer bitstream; and
a video decoder coupled to the one or more processors, the video encoder, and the memory, the video decoder comprising:
a base layer bitstream decoding circuitry that processes the base-layer bitstream, the processing including (i) decoding of the prediction mode of the coding unit of the base-layer bitstream, and (ii) supplying the decoded prediction mode to a first sample adaptive offset (SAO) filter, the decoded prediction mode of the coding unit indicating an inter-layer or an intra-layer prediction mode; and
an enhancement layer decoding flow circuitry that includes a second SAO filter, the enhancement layer decoding flow circuitry being configured to:
re-use SAO filter parameters for the second SAO filter in accordance with (i) inter-layer SAO filter parameter re-use when the decoded prediction mode of the coding unit of the base layer bitstream or a lower enhancement layer bitstream indicates inter-layer coding, and (ii) intra-layer SAO filter parameter re-use when the decoded prediction mode of the coding unit of the base layer bitstream or a lower enhancement layer bitstream indicates intra-layer coding to decode an enhancement layer bitstream from among the one or more enhancement layer bitstreams; and
when performing the inter-layer SAO filter parameter re-use, to utilize the decoded prediction mode of the coding unit of the base layer bitstream or the lower enhancement layer bitstream instead of utilizing an SAO control flag included in the SAO filter parameters.

8. The device of claim 7, wherein the SAO filter parameters include one or more of the following: control flags, SAO types, and SAO offset values.

9. The device of claim 7, wherein the first SAO filter provides a select number of the SAO filter parameters to re-use in the second SAO filter.

10. The device of claim 7, wherein the SAO filter parameters of the base-layer bitstream or a lower enhancement layer bitstream are directly re-used to encode the enhancement layer bitstream.

11. The device of claim 7, wherein part of the SAO filter parameters of the base-layer bitstream or a lower enhancement layer bitstream are directly re-used to encode the enhancement layer bitstream.

12. The device of claim 7, wherein the enhancement layer bitstream decoding circuitry decides which SAO filter parameters are used for decoding of a current enhancement layer bitstream.

13. The device of claim 7, further comprising:
a demultiplexer configured to receive the SVC bitstream and to separate the SVC bitstream into the base-layer bitstream and the enhancement layer bitstream.

14. A method of implementing sample adaptive offset (SAO) parameter re-use for scalable video coding (SVC) decoding, comprising:
performing sample adaptive offset (SAO) filtering to a coding unit (CU) of a lower-layer bitstream to generate SAO filtering parameters;
decoding a predictive mode of the CU of the lower-layer bitstream, the predictive mode of the CU indicating one of an inter-layer or an intra-layer predictive mode, the lower-layer bitstream including a base layer or a lower enhancement layer bitstream; and
re-using the SAO filtering parameters to perform SAO filtering of coding units of an enhancement layer bitstream by performing (i) inter-layer SAO filter parameter re-use when the decoded prediction mode of the CU of the base layer bitstream or the lower enhancement layer bitstream indicates inter-layer coding, and (ii) intra-layer SAO filter parameter re-use when the decoded prediction mode of the CU of the base layer bitstream or the lower enhancement layer bitstream indicates intra-layer coding to decode the lower-layer bitstream,
wherein, when performing the inter-layer SAO filter parameter re-use, utilizing the decoded prediction mode of the CU of the base layer bitstream or the lower enhancement layer bitstream instead of utilizing an SAO control flag included in the SAO filtering parameters.

15. The method of claim 14, wherein temporal neighbor coding unit from a decoded enhancement layer bitstream is re-used to decode a current enhancement layer coding unit.

16. The method of claim 14, wherein inter-layer coding unit from the lower layer bitstream is re-used to decode a current enhancement layer coding unit.

17. The method of claim 14, wherein spatial neighbor coding unit from the enhancement layer bitstream is re-used to decode a current enhancement layer coding unit,
wherein the spatial neighbor coding unit includes a left, a top, a top-left or a top-right coded neighboring coding unit of the current enhancement layer coding unit.

18. The method of claim 14, wherein the re-used SAO filtering parameters are applied for Y, Cb, and Cr spaces.

19. The method of claim 14, wherein the SAO filtering parameters include one or more of the following: control flags, SAO types, and SAO offset values.

20. The device of claim 1, wherein the enhancement layer bitstream decoding circuitry is configured to adaptively perform either inter-layer or intra-layer SAO filter parameter re-use as indicated by the decoded prediction mode of the coding unit of the base layer bitstream or the lower enhancement layer bitstream.

* * * * *